Nov. 27, 1945.  T. C. APPLEMAN  2,389,587
HEATING APPARATUS
Filed Nov. 5, 1942  2 Sheets-Sheet 1

WITNESSES:
Roy N. Envell
George F. Caldwell

INVENTOR
THEODORE C. APPLEMAN
BY R. J. Eisinger
ATTORNEY

Nov. 27, 1945.  T. C. APPLEMAN  2,389,587
HEATING APPARATUS
Filed Nov. 5, 1942                    2 Sheets-Sheet 2

WITNESSES:

INVENTOR
THEODORE C. APPLEMAN
BY
ATTORNEY

Patented Nov. 27, 1945

2,389,587

UNITED STATES PATENT OFFICE 2,389,587

HEATING APPARATUS

Theodore C. Appleman, Mansfield, Ohio, assignor to Westinghouse Electric Corporation, East Pittsburgh, Pa., a corporation of Pennsylvania Application November 5, 1942, Serial No. 464,597

5 Claims. (Cl. 219—25)

This invention relates to heating apparatus and particularly to an improved electric heating unit and the method of making the same.

The present invention is an improvement on the invention disclosed and claimed in Patent No. 2,389,588 of Kenneth L. Woodman, assigned to the assignee of the present invention. The Woodman application discloses heating units for flatirons and electric cooking ranges in which a metal body is provided with a groove having a sheathed heating element pressed therein and filled with good heat-conducting material and closed by means of a plate having its edges pressed into the side walls of the groove in the manner disclosed in Arnold et al. Patent No. 2,222,192, assigned to the assignee of the present invention.

It is an object of the present invention to provide a heating unit like that disclosed in the Woodman application, but in which a greater portion of the surface of the sheathed heating element is in direct contact with the metallic body.

These and other objects are effected by the invention as will be apparent from the following description and claims taken in connection with the accompanying drawings, forming a part of this application, in which:

Figure 1:
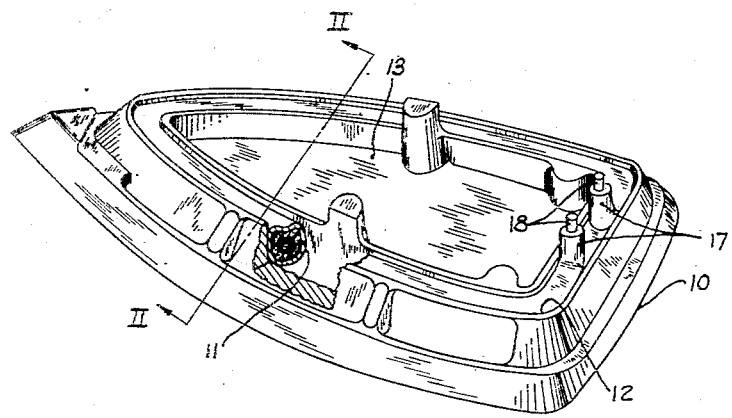
Fig. 1 is a perspective view, partially broken away, of a flatiron soleplate made in accordance with the present invention.

The soleplate, generally indicated 10, may be of conventional outline and is provided with a sheathed heating element 11. The soleplate is preferably made of metal, such as cast aluminum or iron, and, as is well understood in the art, will be provided with superstructure (not shown) including a cover or shell and a handle, together with thermostatic means for controlling the temperature of the soleplate. The soleplate casting may be siimlar to that shown in Arnold et al. Patent No. 2,222,192. The soleplate has a cast-in, round-bottom groove 12 extending around the soleplate near its edges for receiving the sheathed heating element, and is provided with a central, approximately triangular recessed area 13 in which a thermostatic switch or the like (not shown) is adapted to be mounted.

The sheathed heating element 11 comprises a helically-coiled resistance wire 14 embedded in highly-compacted, heat-conducting, electrical insulating material 15 disposed within a tubular metallic sheath 16. The manner of making the sheathed heater is well known and need not be described. The sheath may be made of steel tubing and is preferably of a size to be snugly received in the groove 12. As shown particularly in Fig. 2, the sheath is initially circular or round in cross section to fit in the bottom of the groove.

The ends 17 of the heating element are turned up at the rear of the soleplate to facilitate connection of the terminal pins 18 of the resistance wire 14 to the usual supply cord in series with a thermostatic switch mounted in the mentioned central recess 13.

In practicing the invention, the soleplate 10 is cast, in the form shown in Fig. 1, with the deep groove 12 therein. This casting, which is usually rough, is ground and polished and plated, if desired, before assembling the sheathed heating element thereto. It will be appreciated that in finishing the soleplate casting before assembling the heating element thereto, any casting defects become apparent so that the casting alone may be scrapped or repaired, if possible, without loss of the heating element.

The groove 12 may be left in its rough cast condition or finished smooth. If the surface of the groove is very rough, it may be desirable to apply a thin slip or a suitable heat-conducting material, such as silicon carbide-water glass cement, to the sheath before placing it in the groove, as disclosed in the mentioned Woodman application. The sheathed heating element is placed over the groove in the soleplate and pressed into the bottom of the groove by means of a die 19 under a pressure of 10 to 20 tons per square inch, so that any irregularities of the casting will imbed themselves in the sheath and provide good metal-to-metal contact between the sheath surface and the adjacent surface of the groove. Any voids which might remain between the surfaces of the sheath and the groove are filled by the slip of cement, so that a good heat-conducting path is provided between the sheath and the wall of the groove throughout their engaging surfaces.

Figure 2:
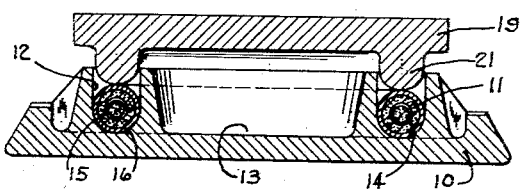
Fig. 2 is a sectional view taken substantially on the line II—II of Fig. 1, and showing the soleplate in an initial stage of manufacture.
Figure 3:
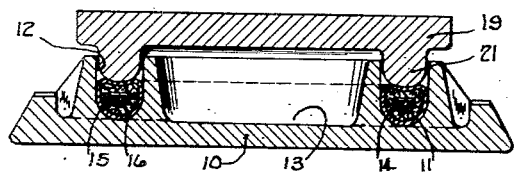
Fig. 3 is a sectional view corresponding to Fig. 2, showing the soleplate in a later stage of manufacture.
Figure 4:
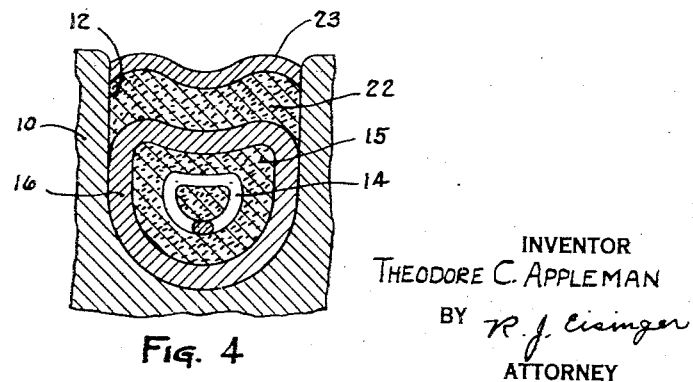
Fig. 4 is an enlarged sectional view of a portion of the soleplate, showing the soleplate in its final stage of manufacture.

The salient feature of the present invention is in deforming the sheathed heating element, as shown in Figs. 2 and 3, by utilizing a die having a rounded or otherwise suitably shaped portion 21 for engaging a narrow region of the uppermost part of the sheath. Since the element is substantially a solid incompressible body, application of pressure along a relatively narrow central region or zone of the element causes the sides of the element to be forced out and up the sides of the groove, thus giving substantially more contact surface area between the outer surface of the element and the surface of the groove and more side pressure to increase the thermal conductivity and provide a better seal between the sheathed element and the casting that is obtainable when using flat-bottomed or concave dies shaped to fit the top of the sheath.

After the sheath has ben pressed into place in the manner described above, the soleplate is now ready for use. However, if desired, the groove may be filled with a material 22 having a good thermal conductivity, such as silicon carbide-water glass cement or powdered metal, as disclosed in the Woodman application. The filling material may be pressed into place and, in the event a paste of the cement is used, it is desirable to dry this for a period of approximately 16 hours at a temperature of 400 to 500 degrees. The filling material acts as a heat shunt to conduct heat away from the upper surface of the sheath to the soleplate, and this heat shunt may be made more effective by applying a cover plate 23 having its edges imbedded in the side walls of the groove.

Figure 5:
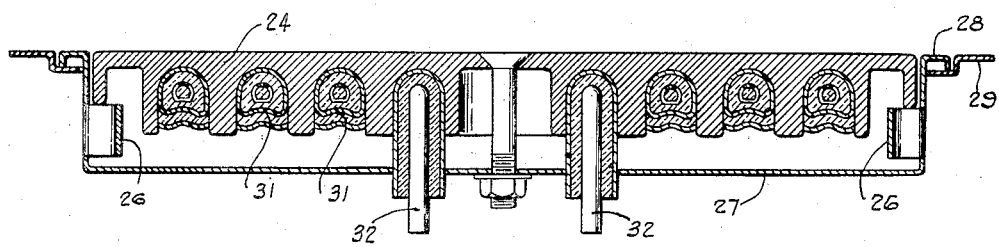
Fig. 5 is a sectional view of a surface heating unit, such as used in electric cooking ranges and the like, and in which the present invention is incorporated.
Figure 6:
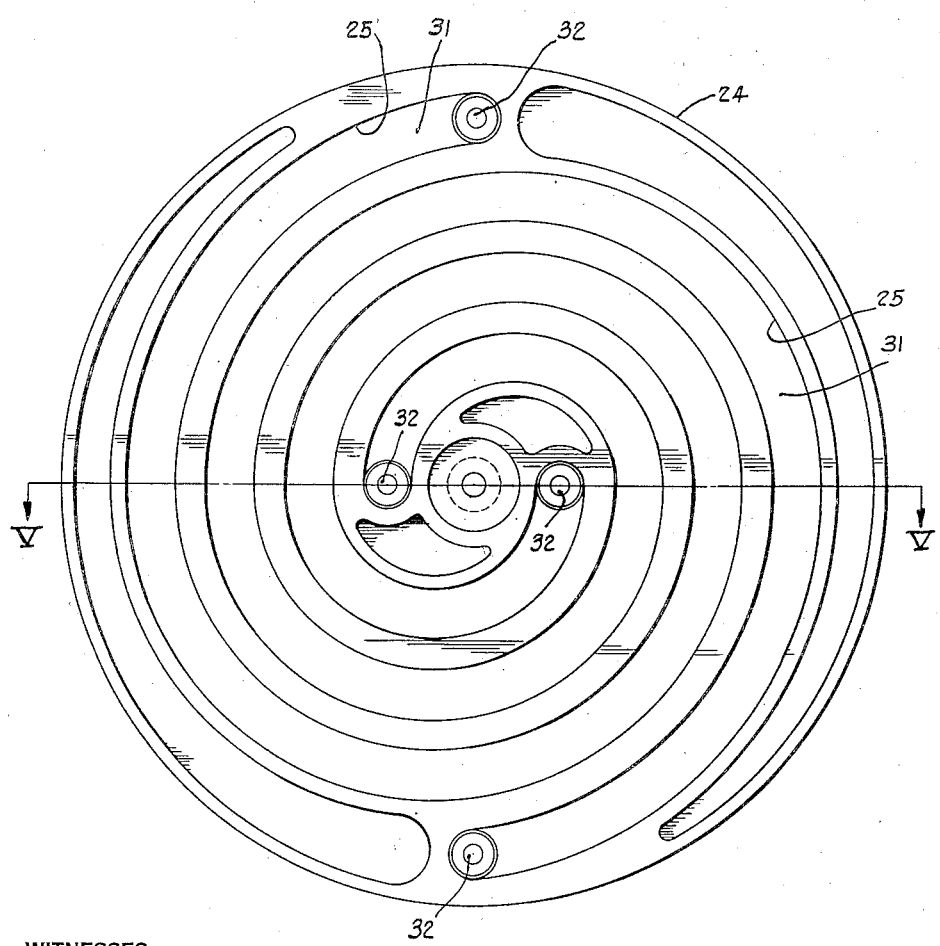
Fig. 6 is a bottom plan view of the top plate of the unit shown in Fig. 5.

In Figs. 5 and 6, the invention is shown applied to a surface heating element, such as employed in electrical cooking ranges. The surface element comprises a cast metal top plate 24 having a pair of concentrically-arranged spiral grooves 25 provided in the under surface thereof. This top plate is supported on spaced lugs 26 formed in the side walls of a pan 27 provided with an outwardly-turned flange 28 adapted to engage the margin of the range top 29 at the opening which receives the surface unit. Two spiral sheathed heating elements 31 are assembled in the grooves 25 in the manner described above in connection with the soleplate illustrated in Figs. 1 to 4, their terminals 32 extending downwardly through the pan 27 for connection to a suitable source of electricity.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. The method of making an electrical heating unit provided with a metal body having a sheathed electrical heating element for heating the same disposed within a groove in said body, which method comprises applying pressure to the sheathed heating element along a relatively narrow zone over the center of the element, said pressure being of sufficient magnitude to deform the element and to cause the portions on opposite sides of said narrow zone to be raised above said narrow zone and thereby to press a substantial portion of the surface of the sheath into contact with the wall of the groove.

2. The method of making an electrical heating device provided with a body having a sheathed electrical heating element, initially circular in cross section, received in a round bottomed groove in said body and of substantially the same width as the diameter of said sheathed element, which method comprises applying pressure to said sheathed element along a narrow zone approximately over the center thereof to deform said element and force substantially more than one-half of the surface of said sheathed heating element into contact with the wall of said groove, said pressure being of sufficient magnitude to cause the portions on opposite sides of said narrow zone to be raised above said narrow zone.

3. An electrical heating device comprising a body to be heated having a round bottomed groove therein, and a sheathed heating element, initially circular in cross section, disposed in the bottom of said groove, said groove having a width substantially the same as the diameter of said sheathed element, said initially circular section element having a depression, substantially in the center of that portion of the sheathed element not in contact with wall of said groove, formed by applying pressure along a relatively narrow central zone of said portion while said sheathed heating element is in said groove.

4. An electrical heating device comprising a body to be heated having a round bottomed groove therein, and a sheathed heating element, initially circular in cross section, disposed in the bottom of said groove, said groove having a width substantially the same as the diameter of said sheathed element, said initially circular section element having a depression, substantially in the center of that portion of the sheathed element not in contact with wall of said groove, formed by applying pressure along a relatively narrow central zone of said portion while said sheathed heating element is in said groove, and heat-conducting means filling said groove to a point above said sheathed element for conducting heat from said portion to the body.

5. The method of making an electrical heating unit of the type having a body to be heated which method comprises providing a body with a recess of a size to receive a sheathed electric heater, placing a sheathed electric heater into said recess and applying pressure to said sheathed heater, along a relatively narrow zone, of sufficient magnitude to deform said heater and to cause the portions on opposite sides of said narrow zone to be raised above said narrow zone, thereby forcing said heater into intimate contact with the wall of said recess.

THEODORE C. APPLEMAN.